(12) United States Patent
Yang et al.

(10) Patent No.: US 11,841,771 B1
(45) Date of Patent: Dec. 12, 2023

(54) DATA AUTO-BACKUP SYSTEM

(71) Applicant: AMARYLLO INC., Irvine, CA (US)

(72) Inventors: Chao-Tung Yang, Zhubei (TW); Wei-Jen Lee, Zhubei (TW)

(73) Assignee: AMARYLLO INC., Irvine, CA (US)

( * ) Notice: Subject to any disclaimer, the term of this patent is extended or adjusted under 35 U.S.C. 154(b) by 0 days.

(21) Appl. No.: 18/125,821

(22) Filed: Mar. 24, 2023

(51) Int. Cl.
| | |
|---|---|
| *G06F 11/14* | (2006.01) |
| *G06F 16/182* | (2019.01) |
| *G06F 21/60* | (2013.01) |
| *G06F 16/11* | (2019.01) |

(52) U.S. Cl.
CPC ........ *G06F 11/1464* (2013.01); *G06F 16/122* (2019.01); *G06F 16/1827* (2019.01); *G06F 21/602* (2013.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 2015/0244798 A1* | 8/2015 | Bolotin | ............... | H04L 67/1097 709/217 |
| 2018/0246661 A1* | 8/2018 | Lemelev | ............... | G06F 3/0619 |
| 2020/0304574 A1* | 9/2020 | Gupta | .................. | G06F 3/0605 |

\* cited by examiner

*Primary Examiner* — Eddy Cheung
(74) *Attorney, Agent, or Firm* — Birch, Stewart, Kolasch & Birch, LLP

(57) ABSTRACT

A data auto-backup system includes a main server and a terminal device. The main server includes a registered account, and the terminal device includes an application connected to the main server. When the application of the terminal device detects a registered portable storage device connected to the connection port, the application reads a local file stored in the registered portable storage device, and uploads the local file to the registered account in the main server as a cloud backup file. As a result, the terminal device automatically backs up the local file of the registered portable storage device to the main server whenever the registered portable storage device is connected, saving the user from manual backup steps, and preventing valuable data from missing. Furthermore, a software solution to encrypt data in the portable devices is employed without introducing any hardware to the existing portable devices.

16 Claims, 8 Drawing Sheets

DATA AUTO-BACKUP SYSTEM

BACKGROUND OF THE INVENTION

1. Field of the Invention

The present invention relates to a data backup system, and more particularly to a data auto-backup system. It allows data to be backed up from local storage to cloud server automatically without human input.

2. Description of the Related Art

Portable storage devices such as a flash drive or external hard drive are commonly used in daily lives for data carrying, sharing or extra-storage. However, as the portable storage device features portability, data and files in the portable storage device are frequently accessed, moved, or amended anytime. It is difficult for the user of the portable storage device to make sure that all of the valuable data and files in the portable storage device are properly backed up in a targeted destination.

Conventional wisdom is first for users to select and transfer data from portable devices to computers and then for users to select a cloud storage to input ID and password to upload data from computers to a designated cloud server. It requires multiple steps and verifications with human inputs. The process is time consuming and frustrating.

SUMMARY OF THE INVENTION

An objective of the present invention is to provide a data auto-backup system to overcome the problems of easily missing and inconvenience in data backup of a portable storage device.

To achieve the foregoing objective, the data auto-backup system includes:

a main server, including a registered account; and a terminal device, including an application connected to the main server through a network system, storing an account information corresponding to the registered account, and having a connection port;

when the application of the terminal device detects a registered portable storage device connected to the connection port which corresponds to the account information, the application reads a local file stored in the registered portable storage device, and uploads the local file to the registered account in the main server as a cloud backup file.

The application running in the terminal device is able to recognize the registered portable storage device with the account information. The application further reads the local file stored in the registered portable storage device and uploads the local file to the registered account of the main server as a cloud backup file. Namely, whenever the user connects the registered portable storage device to the terminal device, the application of the terminal device would automatically back up the local file of the registered portable storage device to the main server.

The present invention saves the user from backup steps including: manually copying the local file in the registered portable storage device, pasting it to the terminal device, connecting the terminal device to a cloud server, and then uploading the local file in the terminal device to the cloud server. The present invention removes human involvements to achieve full automation of offline storage to online storage and online storage to offline.

Furthermore, since the process of uploading the local file to the main server is performed every time the registered portable storage device is connected to the terminal device, the terminal device ensures the local file in the registered portable storage device will be backed up to the main server, preventing valuable data from missing.

Other objectives, advantages and novel features of the invention will become more apparent from the following detailed description when taken in conjunction with the accompanying drawings.

DETAILED DESCRIPTION OF THE INVENTION

Figure 1:
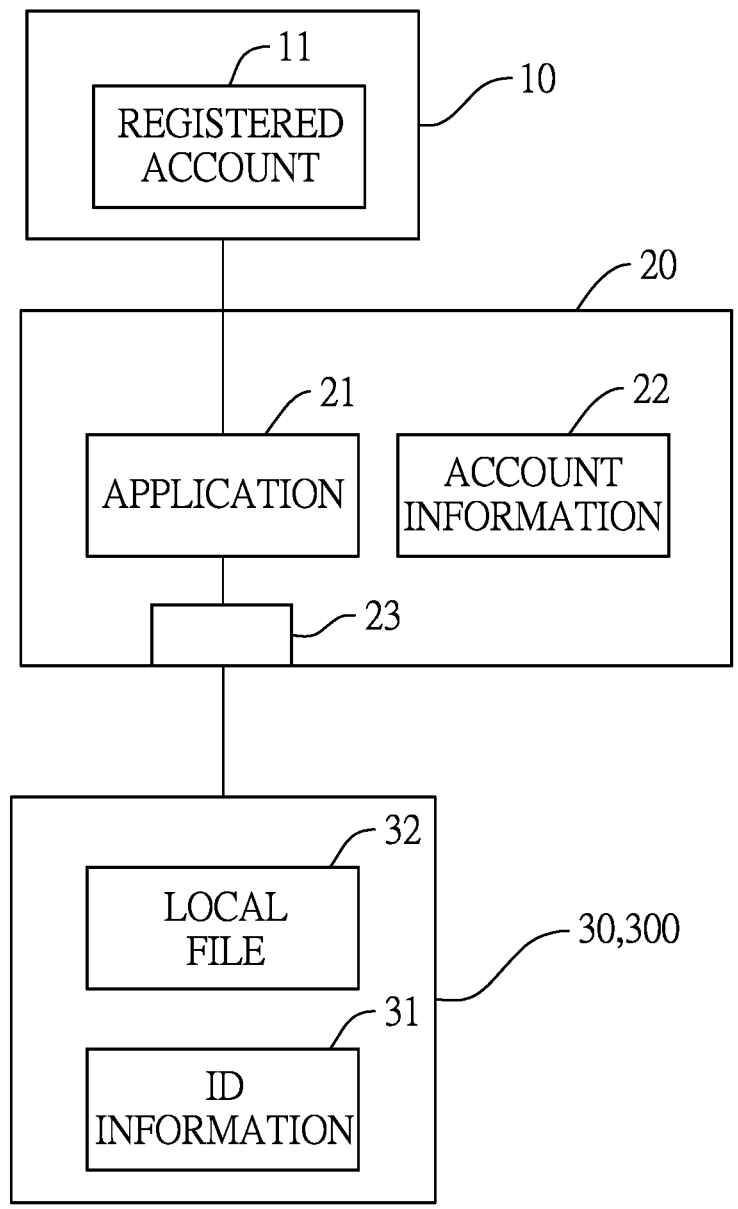
FIG. 1 is a block diagram of a data auto-backup system of the present invention.

With reference to FIG. 1, the present invention is a data auto-backup system, including a main server 10 and a terminal device 20. The main server 10 includes a registered account 11 that belongs to an authenticated user (hereinafter referred to as user), and stores an account information 22 of the registered account 11 for login authentication. The terminal device 20 includes an application 21 connected to the main server 10 through the network system, and also stores the account information that corresponds to the registered account 11. The account information 22 includes an account name and an account password. The terminal device 20 also includes at least one connection port 23 for being connected to a portable storage device. Preferably, the connection port 23 meets the specification of Universal Serial Bus (USB), or a Secure Digital Memory Card (SD card). However, the present invention is not limited to such. For the following description, we may assume that the terminal device 20 is a device that belongs to the user, preferably a personal computer, a laptop computer, a tablet computer, or a mobile smart phone.

When any portable storage device 30 is connected to the connection port 23, the application 21 of the terminal device 20 detects it, reads its ID information 31, and may recognize the portable storage device 30 as a registered portable storage device 300 according to an identifiable condition. When the portable storage device 30 is detected, the application 21 searches for an ID information 31 in the portable storage device 30, and determines if the ID information 31 found in the portable storage device 30 meets the identifiable condition. If the ID information 31 meets the identifiable condition, the application 21 determines the portable storage device 30 is the registered portable storage device 300. Preferably, the identifiable condition is pre-set in the application 21, and the identifiable condition is the ID information 31 being same as an identifiable device information pre-stored in the application 21.

The ID information 31 may be a device name of the portable storage device 30, a media access control (MAC) address of the portable storage device 30, an ID information file that includes an identification code or an identification symbol, or a combination thereof. The ID information 31 may be any information that allows the application 21 to recognize the portable storage device 30. Relatively, the identifiable device information pre-stored in the application 21 is a registered device name, a registered MAC address, a registered ID information file that includes an identification code or an identification symbol, or a combination thereof.

Figure 2:
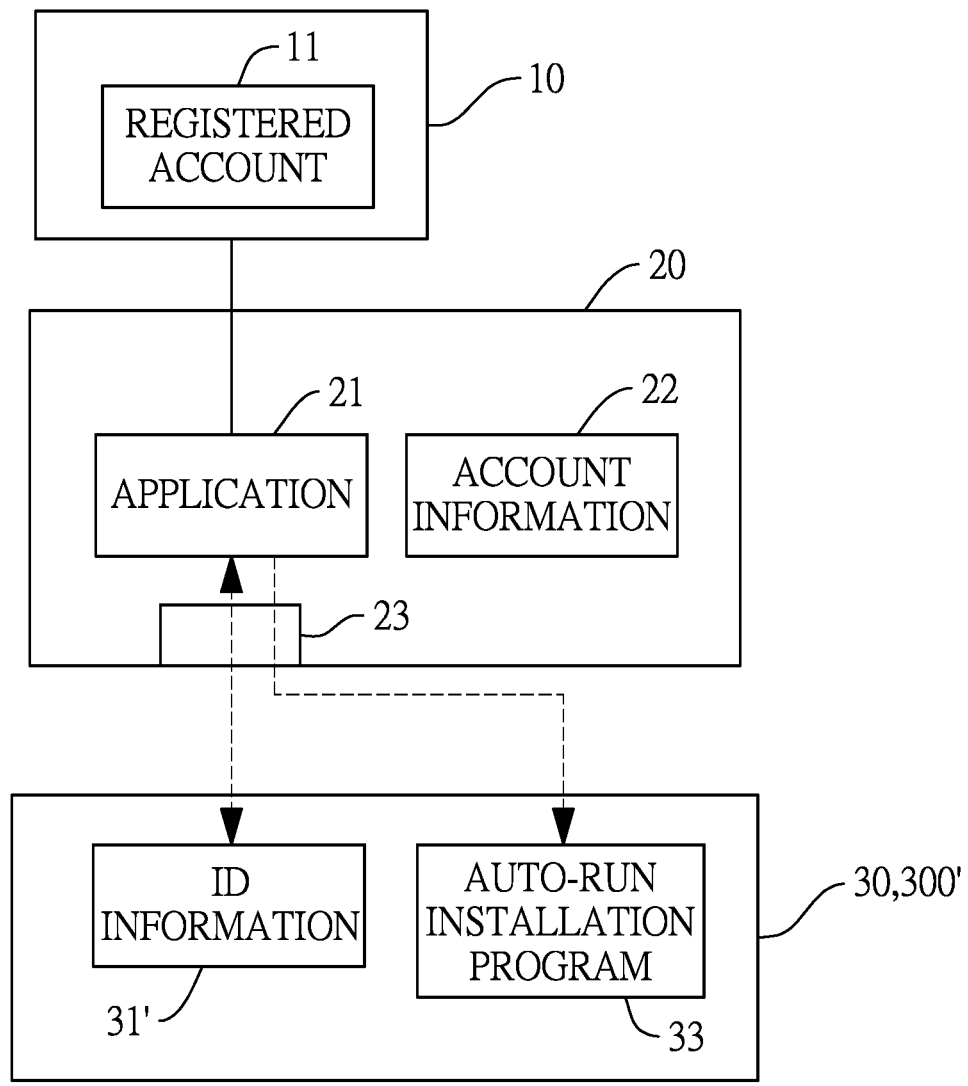
FIG. 2 is another block diagram of a data auto-backup system of the present invention.

With reference to FIG. 2, when the ID information in the portable storage device 30 does not meet the identifiable condition, that is, an ID information that is same as the identifiable device information cannot be found in the portable storage device 30, the application 21 of the terminal device 20 recognizes the portable storage device 30 as an unregistered portable storage device 300', and the ID information in the unregistered portable storage device 300' is an unregistered ID information 31'. The application 21 may output a message to the user, and ask for the user's consent to register the unregistered portable storage device 300'. When the application 21 of the terminal device 20 further receives a device register instruction, the application 21 of the terminal device performs a device register process for the unregistered portable storage device 300'.

The register process for the unregistered portable storage device 300' may include the following steps: storing the unregistered ID information 31' of the unregistered portable storage device 300' to the terminal device 20 as the identifiable device information, changing the unregistered ID information 31' of the unregistered portable storage device 300' according to the identifiable device information, or storing an ID information file including an identification code or identification symbol to the unregistered portable storage device 300' according to the identifiable device information. Furthermore, the application 21 of the terminal device 20 may store an auto-run installation program of the application 21 to the unregistered portable storage device 300'.

After the register process, the unregistered storage device 300' now includes ID information that corresponds to the identifiable device information. The status of the unregistered portable storage device 300' is transformed into a registered portable storage device 300, and can be recognized by the application 21 of the terminal device 20.

When the application 21 of the terminal device 20 detects the registered portable storage device 300 is connected to the connection port 23, the application 21 reads a local file 32 stored in the registered portable storage device 300, and uploads the local file 32 to the registered account 11 in the main server 10 as a cloud backup file.

The offline (registered portable storage device 300)-to-online (main server 10) backup process as described above allows the application 21 of the terminal device 20 to back up the local files 32 in the registered portable storage device 300 to the main server 10 without the user further operating the application 21 or the terminal device 20 after connecting the registered portable storage device 300 to the terminal device 20.

Furthermore, traditional portable devices employ hardware encryption chips to offer additional data protection, which cost additional manufacture cost. In this present invention, a software solution to encrypt data in the portable devices is employed without introducing any hardware to the existing portable devices.

Figure 3:
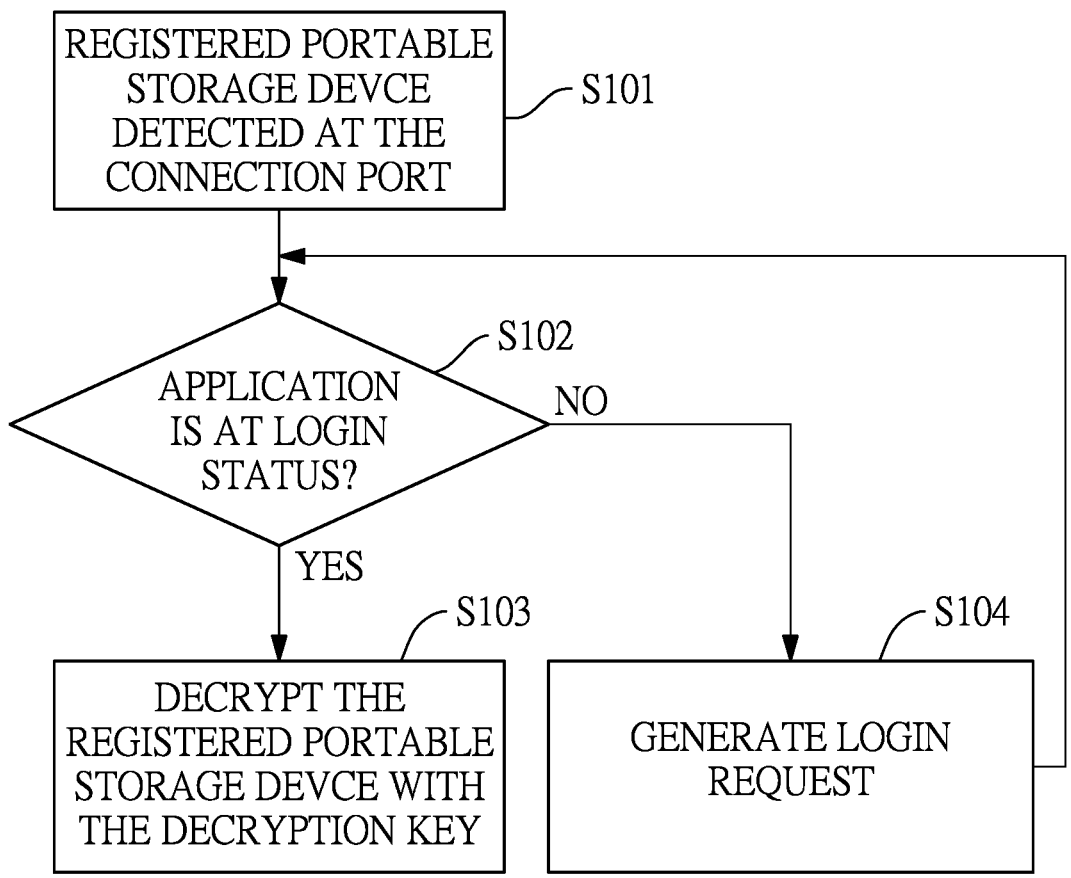
FIG. 3 is a flow chart of the backup process of the data auto-backup system of the present invention.

With reference to FIG. 3, in a first preferred embodiment, the terminal device 20 further stores a decryption key corresponding to the registered portable storage device 300. The decryption key may be stored as part of the account information 22, namely, the account information further includes the decryption key. When the application 21 of the terminal device 20 detects the registered portable storage device 300 is connected to the connection port 23 (S101), the application 21 determines whether the application 21 is in a login status (S102). If the application 21 is in the login status, the application 21 decrypts the registered portable storage device 300 by the decryption key (S103) to read the local file 32, and may further go on with the process to upload the local file 32 to the registered account 11 in the main server. If the application 21 is not in the login status, the application 21 generates a login request (S104). After the user inputs the account name and account password, the application 21 is switched to the login status, and the application 21 may access the decryption key and decrypt the registered portable storage device 300.

In the present embodiment, the registered portable storage device 300 is encrypted by an encryption key, and therefore protected from an unauthorized person. When the user connects the registered portable storage device 300 to the connection port 23 of the terminal device 20, and the application 21 of the terminal device 20 is in the login status, the application 21 decrypts the registered portable storage device 300, and the user may browse through the file in the registered portable storage device without the process of entering the decryption key or a password. Since, as mentioned above, we assume the terminal device 20 belongs to said user, the application 21 stays in the login status and runs in the background of the operation system of the terminal device 20. Namely, the registered portable storage device 300 with encryption is transparent for the terminal device 20 with the application 21 in login status. Therefore, for the user of the terminal device 20 under normal using condition, even though the registered portable storage device 300 is encrypted, the user may connect the registered portable storage device 300 to the terminal device 20 and access the stored data in the registered portable storage device 300 without the process of entering the decryption key, as if the registered portable storage device 300 is not encrypted.

On the other hand, an unauthorized person, who picks up the registered portable storage device 300 accidentally, is unable to access the data in the registered portable storage device 300 with another terminal device without the application 21 of the terminal device 20, particularly without the account name, account password, or the decryption key stored in the account information 22 in the terminal device 20.

The present embodiment of the invention improves the data security and the convenience of the user simultaneously.

Figure 4:
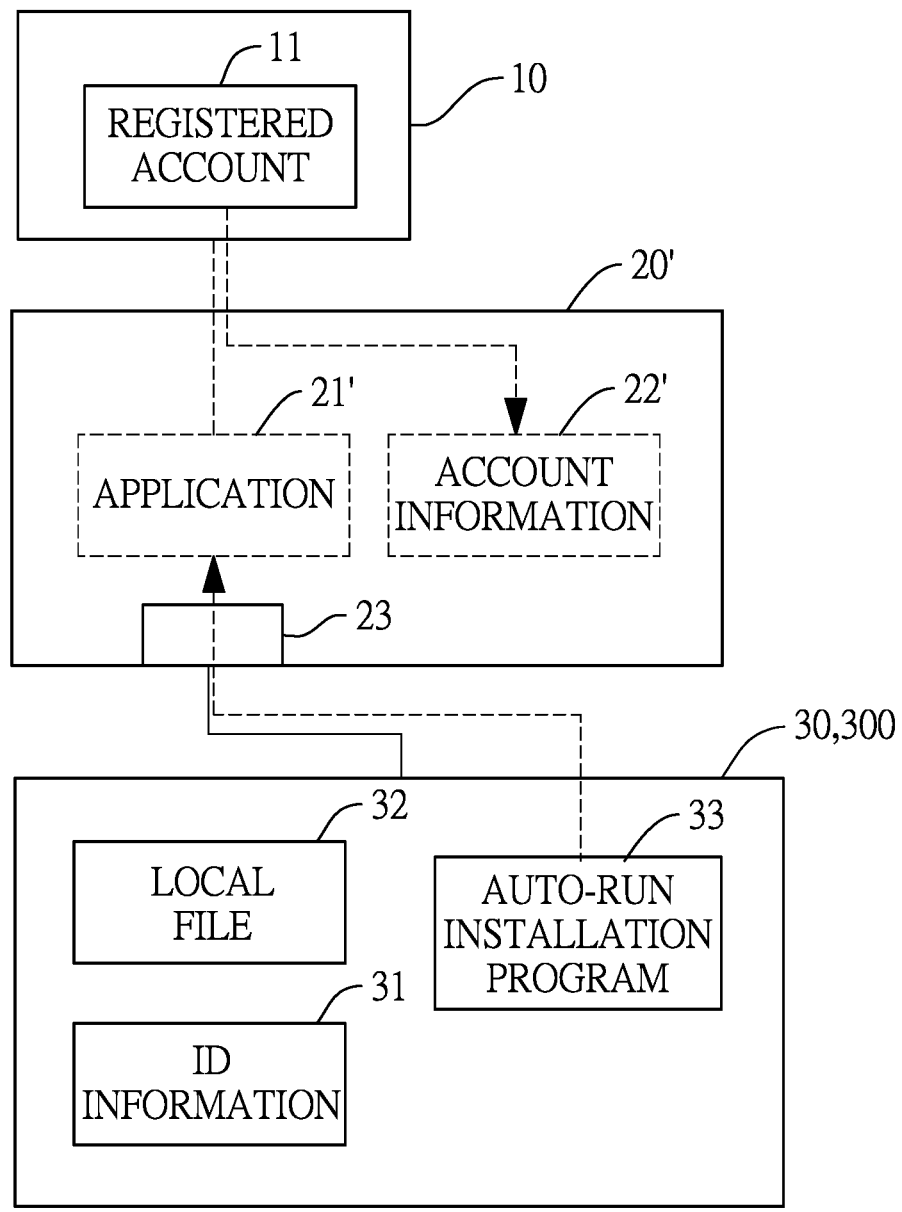
FIG. 4 is a block diagram of a preferred embodiment of the data auto-backup system of the present invention.

With reference to FIG. 4, in a preferred embodiment, the registered portable storage device 300 stores the ID information 31, and may further store the auto-run installation program 33 of the application 21, and the ID information 31.

Therefore, when the user connects the registered portable storage device 300 to another terminal device that is not installed with the application 21 (hereinafter refer to as a second terminal device 20'), the auto-run installation program 33 of the application 21 may be executed and installs the application 21' to the second terminal device 20'. After the application 21' is installed in the second terminal device 20', the application 21' connects to the main server 10. When the user enters the account name and account password on the second terminal device 20', the application 21' may retrieve the account information 22' from the registered account 11 according to the account name and account password, if verified by the main server 10, and the application 21' in the second terminal device 20' is switched to the login status. The application 21' in the second terminal device 20' may then retrieve the decryption key of the registered portable storage device 300 along with the account information, and access the data in the registered portable storage device 300, or start the offline-to-online backup process with the second terminal device 20.

The registered portable storage device 300 of the invention provides a mechanism for the user of the registered portable storage device 300 to access the data in the registered portable storage device 300 or perform the backup process on a second terminal device 20'. Therefore, the usage of the registered portable storage device 300 is not limited to the terminal device 20 that belongs to the user.

Figure 5:
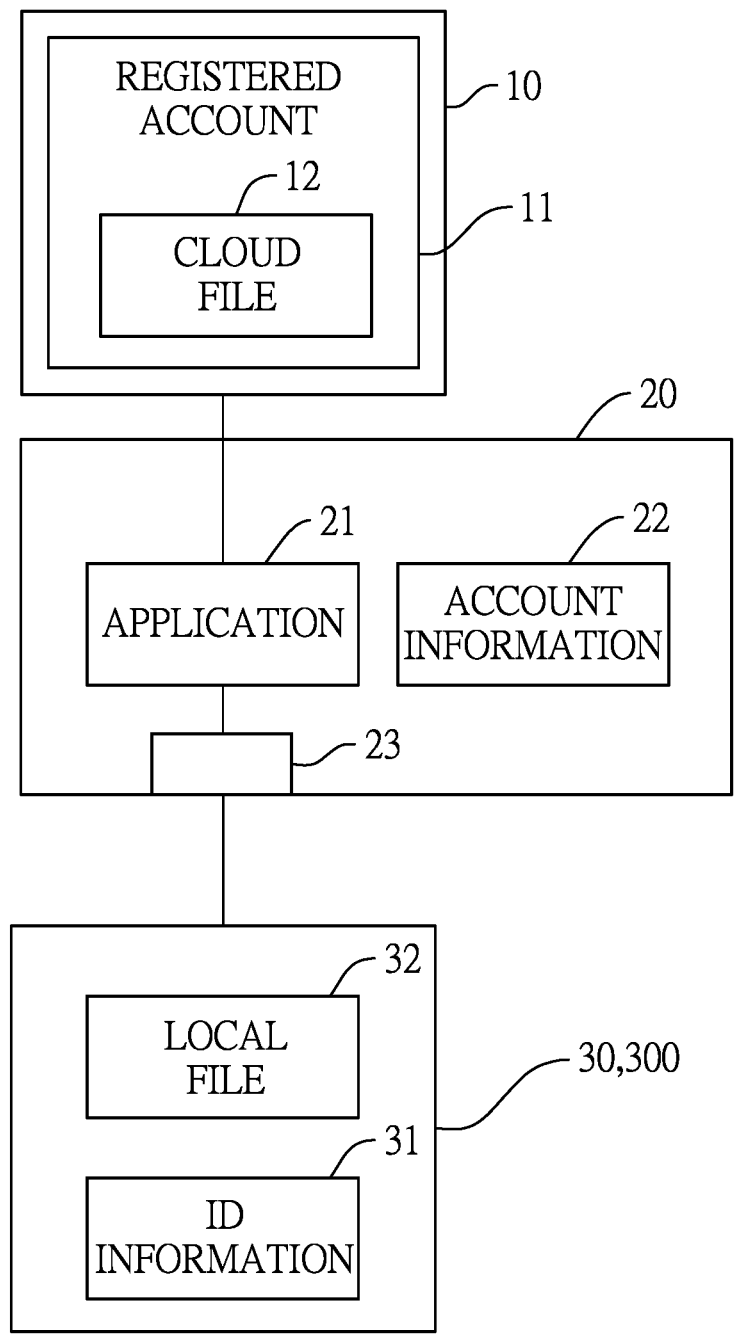
FIG. 5 is a block diagram of a second embodiment of the data auto-backup system of the present invention.

With reference to FIG. 5, in a second preferred embodiment, at least one cloud file 12 is stored in the registered account 11 of the main server 10. When the application 21 of the terminal device 20 detects the registered portable storage device is connected to the connection port 23, the application 21 further downloads the cloud file 12 from the registered account 11 of the main server 10, and stores the cloud file 12 to the registered portable storage device 300 as a local backup file.

In this embodiment, an online-(main server 10) to-offline (registered portable storage device 300) backup process is provided. Not only the local file 32 in the registered portable storage device 300 is backed up to the main server 10, the cloud file 12 in the main server 10 is also backed up to the registered portable storage device 300.

Figure 6:
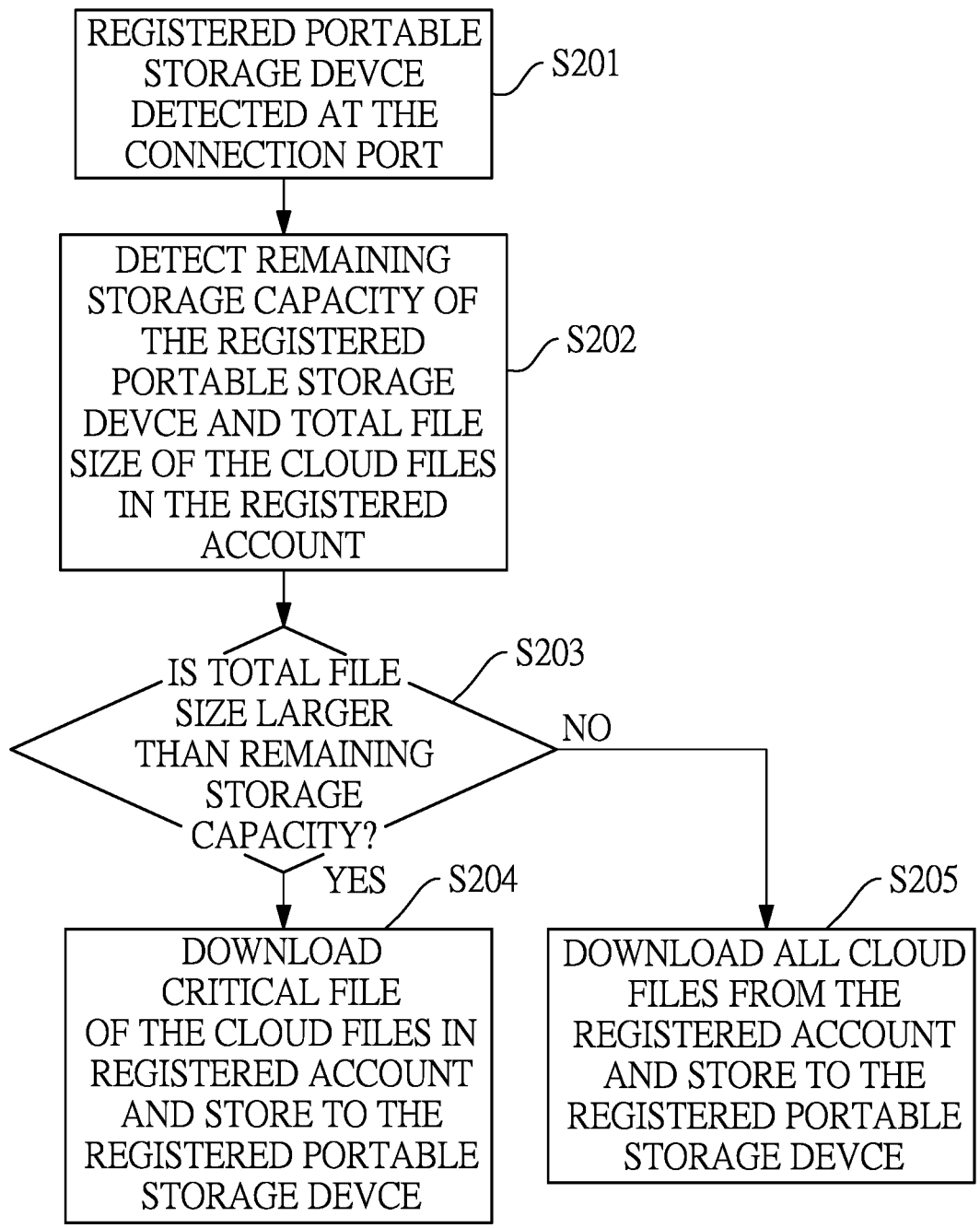
FIG. 6 is a flow chart of a third embodiment of the backup process of the data auto-backup system of the present invention.

With reference to FIG. 6, in a third preferred embodiment, multiple cloud files 12 are stored in the registered account 11 of the main server 10. When the application 21 of the terminal device 20 detects the registered portable storage device 300 is connected to the connection port 23 (S201), the application 21 further detects a remaining storage capacity of the registered portable storage device 300, and detects a total file size of the cloud files 12 in the registered account 11 of the main server 10 (S202). The application 21 then compares the remaining storage capacity of the registered portable storage device 300 with the total file size (S203). When the total file size is not larger than the remaining storage capacity, the application 21 downloads all of the cloud files 12 from the main server 10 and stores the cloud files 12 to the registered portable storage device 300 (S204). When the total file size is larger than the remaining storage capacity, the application 21 downloads at least one critical file of the cloud files 12 in the main server 10, and stores the at least one critical file to the registered portable storage device 300 (S205).

In the present embodiment, the application 21 of the terminal device 20 first compares the total file size to be stored to the registered portable storage device 300 with the remaining storage capacity of the registered portable storage device 300. If the remaining storage capacity is not enough to store all of the cloud files 12, the application 21 only downloads the at least one critical file among the cloud files 12 and store the at least one critical file to the registered portable storage device 300.

The defining condition of the critical file in the cloud files 12 may be predetermined by the user. In some embodiments, the critical file is defined according to the file related information. Each cloud file 12 includes a file related information that includes a file access record. The application 21 of the terminal device 20 may calculate an accessed frequency of the cloud file 12, or may simply read the accessed time of the cloud file 12. In some embodiments, the cloud file 12 is a critical file if the accessed frequency of the cloud file 12 is higher than a frequency threshold, or the last accessed time of the cloud file 12 is within a predetermined time period. The frequency threshold and the predetermined time period may be set by the user.

Figure 7:
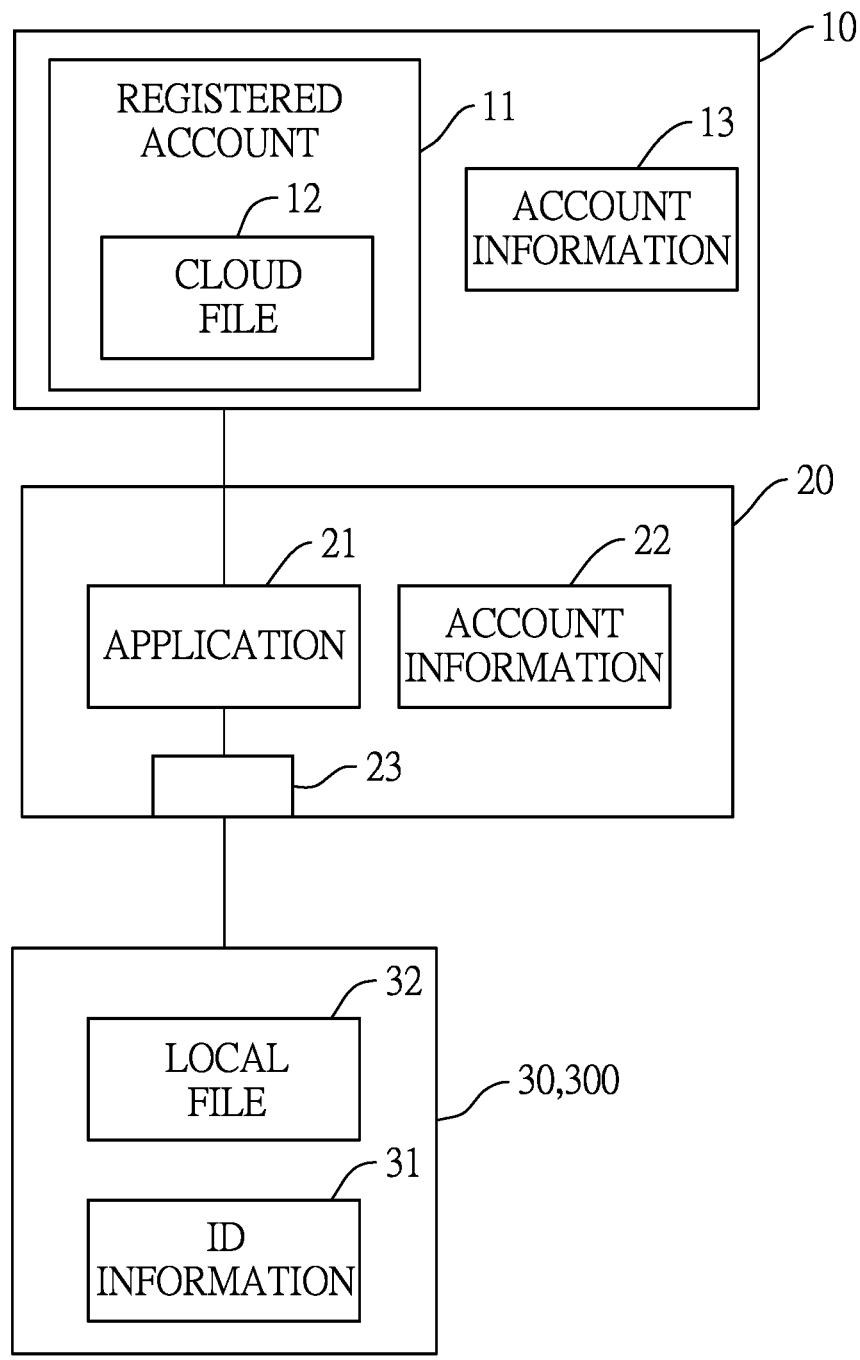
FIG. 7 is a block diagram of a fourth embodiment of the data auto-backup system of the present invention.

With reference to FIG. 7, in a fourth embodiment of the present invention, the main server 10 includes an identified content database 13. After the application 21 of the terminal device 20 reads the local file 32 stored in the registered portable storage device 300, the application 21 performs a content identification process to the local file 32 to generate identified content information of the local file 32. The identified content information may be stored in a temporary data base. Furthermore, when the application 21 uploads the local file 32 to the registered account 11 as the cloud backup file, the application 21 also uploads the identified content information of the local file 32 to the identified content database 13. Finally, when the application 21 accesses the cloud backup file from the main server 10, the application 21 reads the identified content information of the cloud backup file, and outputs the cloud backup file with a content category according to the identified content information.

The identified content information is an abstract or a hashtag of the local file 32 to be uploaded. With the identified content information of the local file 32, the application 21 of the terminal device 20 or the main server 10 is able to learn the content of the cloud backup file without accessing or opening the cloud backup file. For example, if the local file 32 is an image file, and the content identification process is an image object identification process. With the content identification process, the application 21 may recognize that the image of the local file 32 includes a cat, a dog, and children. Therefore, the generated identified content information includes phrases of "cat", "dog", and "children". The identified content information is uploaded to the identified content database 13 in the main server 10 along with the local file 32.

Therefore, when the user accesses the cloud backup file in the main server 10 through the application 21 of the terminal device 20, the application 21 may simultaneously read the identified content information, and display the cloud backup file in the "cat" category, "dog" category, and "children" category.

The local file 32 may also be an audio file, an image file, or a video file, and the content identification process is an audio characteristic identification process or an image object identification process, correspondingly.

The advantage of the present embodiment is that the application 21 of the terminal device 20, instead of the main server 10, runs the content identification process, therefore reducing computing loading of the main server 10. The identified content information is synchronized to the identified content database 13, and is ready to be accessed whenever the user would like to browse the cloud backup files in the registered account 11 of the main server 10. The categorized cloud backup files can be displayed instantly without further computing.

Figure 8:
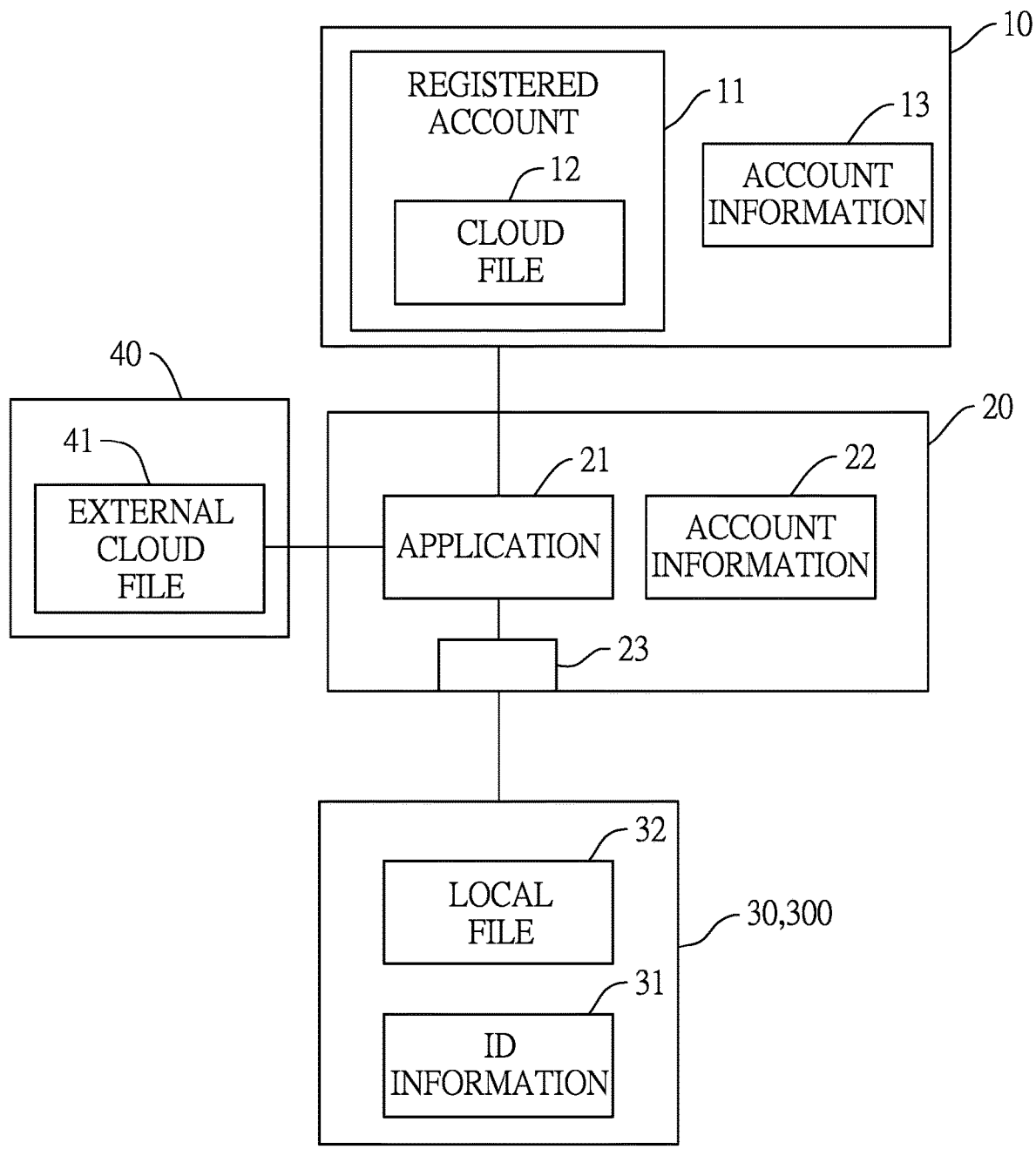
FIG. 8 is a block diagram of a fifth embodiment of the data auto-backup system of the present invention.

With reference to FIG. 8, in a fifth preferred embodiment, the application 21 of the terminal device 20 includes at least one application programming interface (API), and the application 21 of the terminal device 20 is connected to an external server 40 through the API. When the application 21 receives a cloud-to-cloud backup instruction, the application 21 downloads at least one external cloud file 41 from the external server 40 through the API to the terminal device 20, and uploads the external cloud file 41 to the registered account 11 of the main server 10 as a cloud-to-cloud backup file.

In the present invention, the application 21 of the terminal device 20 further provides an online-to-online backup mechanism. The API may be set up according to an open source API specification of the external server 40, such that the application 21 of the terminal device 20 may access the external cloud files 41 in the external server 40. The user may easily back up the external cloud files 41 to the registered account of the main server 10, such that all the files that the user possesses can be backed up in the main server 10 unified.

Preferably, after the application 21 of the terminal device 20 downloads the external cloud file 41 from the external server 40 through the API, the application 21 also performs the content identification process to the external cloud file 41 and generates the identified content information of the external cloud file 41, and uploads the identified content information of the external cloud file 41 to the identified content database 13 when uploading the external cloud file 41 to the main server 10. As a result, similar to the cloud backup file with the identified content database 13 in the main server 10, the application 21 is able to output the cloud-to-cloud backup file with content category according to the identified content information.

It shall be noticed that the cloud backup file and the cloud-to-cloud backup file as mentioned above only refer to files that come from different origin storage devices, that is, the registered portable storage device 300 or the external server 40, and do not refer to files with particular data content. The advantages of the cloud-to-cloud backup file with identified content information is the same as the cloud backup file with identified content information, and is therefore omitted herein.

Additionally, it is often difficult for a mass majority of ordinary users to reorganize or rearrange a large amount of files stored in a cloud server. With the online-to-online backup process of the present embodiment, the external cloud files 12 originally stored in the external server 40 are also attached with the identification content information in the main server 10, and are ready to be browsed with content categories. The external cloud files 12 are categorized automatically though the backup process.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A data auto-backup system, comprising:
   a main server, including a registered account; and
   a terminal device, including an application connected to the main server through a network system, storing an account information corresponding to the registered account, and having a connection port;
   wherein when the application of the terminal device detects a registered portable storage device connected to the connection port which corresponds to the account information, the application of the terminal device reads a local file stored in the registered portable storage device, and uploads the local file to the registered account in the main server as a cloud backup file;
   wherein multiple cloud files are stored in the registered account of the main server;
   when the application of the terminal device detects the registered portable storage device is connected to the connection port, the application of the terminal device detects a remaining storage capacity of the registered portable storage device, and detects a total file size of the cloud files in the registered account of the main server; the application of the terminal device compares the remaining storage capacity of the registered portable storage device with the total file size;
   when the total file size is not larger than the remaining storage capacity, the application of the terminal device downloads the cloud files from the main server and stores the cloud files to the registered portable storage device;
   when the total file size is larger than the remaining storage capacity, the application of the terminal device downloads at least one critical file of the cloud files in the main server, and stores the at least one critical file to the registered portable storage device.

2. The data auto-backup system as claimed in claim 1, wherein
   when the application of the terminal device detects a portable storage device connected to the connection port, the application searches for an identification (ID) information in the portable storage device, and determines whether the ID information meets an identifiable condition;
   when the ID information meets the identifiable condition, the application of the terminal device recognizes the portable storage device as the registered portable storage device.

3. The data auto-backup system as claimed in claim 2, wherein the registered portable storage device is a universal serial bus storage device;
   the ID information includes a device name, a media access control (MAC) address of the registered portable storage device, an ID information file including an identification code, or a combination thereof.

4. The data auto-backup system as claimed in claim 2, wherein
   the registered portable storage device stores an auto-run installation program of the application of the terminal device, and the ID information.

5. The data auto-backup system as claimed in claim 2, wherein the identifiable condition is met when the ID information is same as an identifiable device information pre-stored in the application.

6. The data auto-backup system as claimed in claim 2, wherein
   when the ID information does not meet an identifiable condition, the application of the terminal device recognizes the portable storage device as an unregistered portable storage device; and
   when the application of the terminal device further receives a device register instruction, the application of the terminal performs a device register process for the unregistered portable storage device.

7. The data auto-backup system as claimed in claim 6, wherein the register process includes steps of storing the ID information of the unregistered portable storage device to the terminal device as the identifiable device information, changing the ID information of the unregistered portable storage device to a registered ID information according to the identifiable device information, or storing an ID information file including an identification code to the unregistered portable storage device according to the identifiable device information; and storing an auto-run installation program of the application of the terminal device to the unregistered portable storage device.

8. The data auto-backup system as claimed in claim 1, wherein
the account information stored in the terminal device includes an account name and an account password.

9. The data auto-backup system as claimed in claim 1, wherein
the terminal device stores a decryption key corresponding to the registered portable storage device; when the application of the terminal device detects the registered portable storage device is connected to the connection port, the application of the terminal device determines whether the application of the terminal device is in a login status;
if yes, the application of the terminal device decrypts the registered portable storage device by the decryption key to read the local file;
if not, the application of the terminal device generates a login request.

10. The data auto-backup system as claimed in claim 1, wherein at least one cloud file is stored in the registered account of the main server;
when the application of the terminal device detects the registered portable storage device is connected to the connection port, the application of the terminal device downloads the at least one cloud file from the registered account of the main server, and stores the at least one cloud file to the registered portable storage device.

11. The data auto-backup system as claimed in claim 1, wherein each cloud file includes a file related information including a file access record; the cloud file is as a critical file when an accessed frequency of the cloud file is higher than a frequency threshold, or when a last accessed time of the cloud file is within a predetermined time period, according to the file access record.

12. The data auto-backup system as claimed in claim 1, wherein the main server stores an identified content database;
when the application of the terminal device reads the local file stored in the registered portable storage device, the application of the terminal device performs a content identification process to the local file to generate identified content information of the local file;
when the application of the terminal device uploads the local file to the registered account as the cloud backup file, the application of the terminal device uploads the identified content information of the local file to the identified content database;
when the application of the terminal device accesses the cloud backup file from the main server, the application of the terminal device reads the identified content information of the cloud backup file, and outputs the cloud backup file with a content category according to the identified content information.

13. The data auto-backup system as claimed in claim 1, wherein the local file is an audio file, an image file, or a video file;
the content identification process is an audio characteristic identification process, an image object identification process, or a combination thereof.

14. The data auto-backup system as claimed in claim 1, wherein
the application of the terminal device includes an application programming interface (API), and the application of the terminal device is connected to an external server through the API;
when the application of the terminal device receives a cloud-to-cloud backup instruction, the application of the terminal device downloads an external cloud file from the external server through the API to the terminal device, and uploads the external cloud file to the registered account of the main server as a cloud-to-cloud backup file.

15. The data auto-backup system as claimed in claim 14, wherein the main server stores an identified content database;
after the application of the terminal device downloads the external cloud file from the external server through the API, the application of the terminal device performs a content identification process to the external cloud file to generate identified content information of the external cloud file;
when the application of the terminal device uploads the external cloud file to the registered account as the cloud-to-cloud backup file, the application of the terminal device uploads the identified content information of the external cloud file to the identified content database;
when the application of the terminal device accesses the cloud-to-cloud backup file from the main server, the application of the terminal device reads the identified content information of the cloud-to-cloud backup file, and outputs the cloud-to-cloud backup file with a content category according to the identified content information.

16. The data auto-backup system as claimed in claim 15, wherein the external cloud file is an audio file, an image file, or a video file;
the content identification process is an audio characteristic identification process, an image object identification process, or a combination thereof.

\* \* \* \* \*